March 1, 1960 R. C. KALEY 2,926,709
GUARD FOR ROTARY POWER CUTTER
Filed March 11, 1957 4 Sheets-Sheet 1

INVENTOR
ROBERT C. KALEY
BY
*J Bradley Cohn*
ATTORNEY

March 1, 1960

R. C. KALEY 2,926,709

GUARD FOR ROTARY POWER CUTTER

Filed March 11, 1957

INVENTOR
ROBERT C. KALEY
BY
ATTORNEY

March 1, 1960 R. C. KALEY 2,926,709
GUARD FOR ROTARY POWER CUTTER
Filed March 11, 1957 4 Sheets-Sheet 3
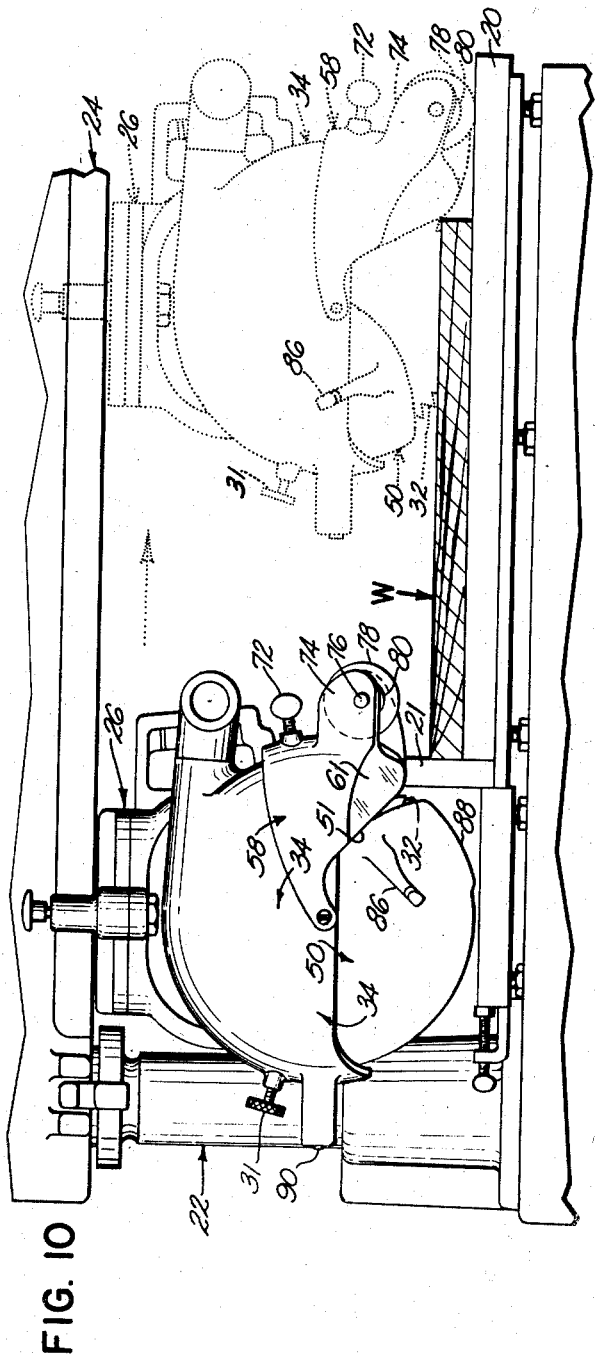
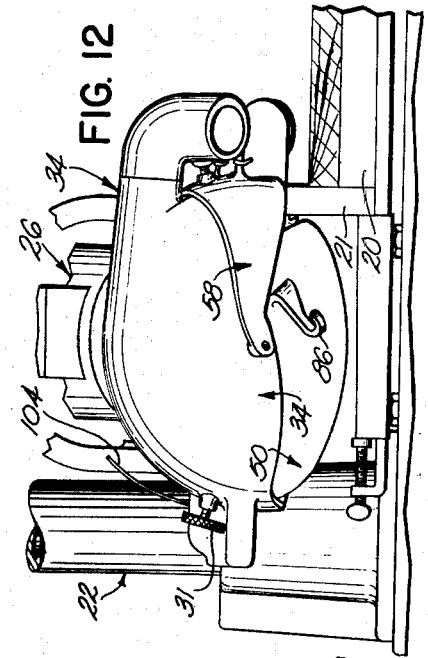
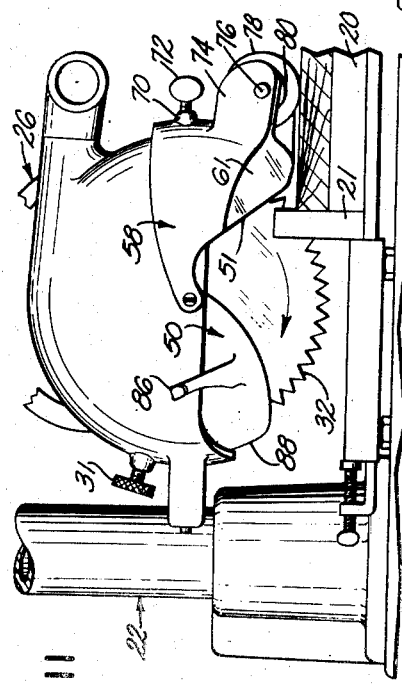
INVENTOR
ROBERT C. KALEY
BY
ATTORNEY March 1, 1960  R. C. KALEY  2,926,709
GUARD FOR ROTARY POWER CUTTER
Filed March 11, 1957  4 Sheets-Sheet 4
FIG. 13
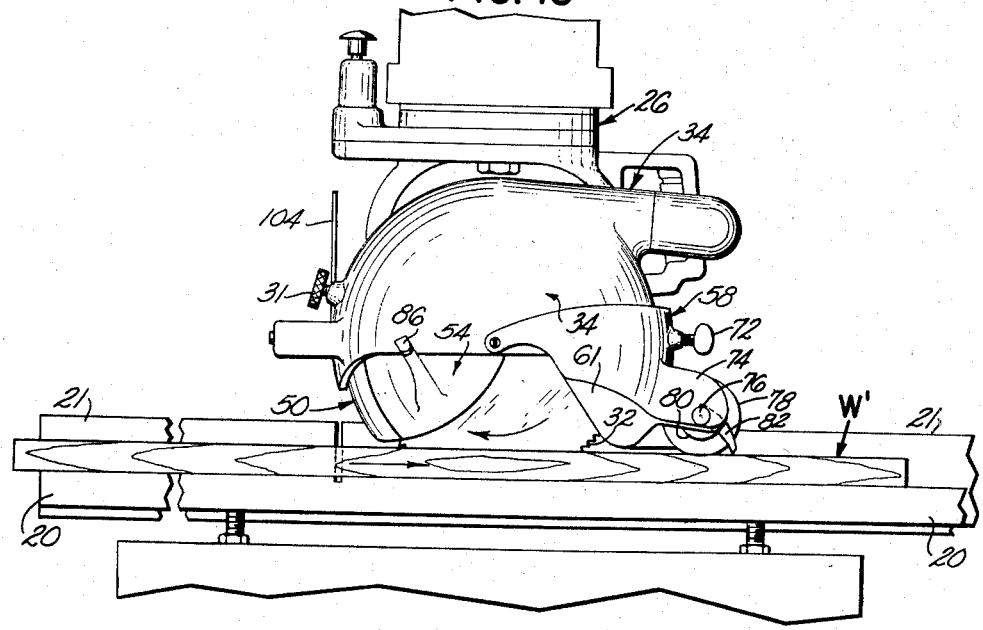
FIG. 14
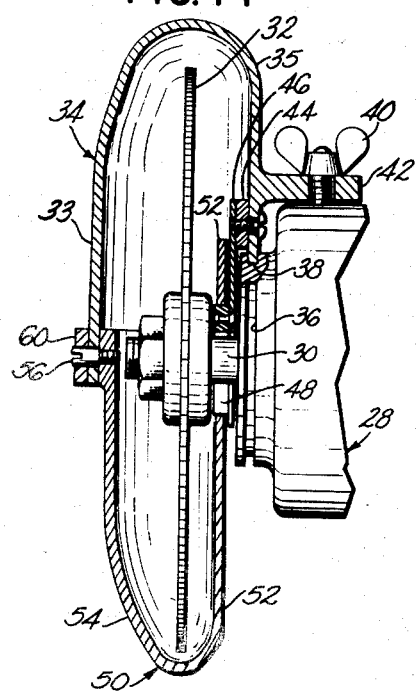
FIG. 15
INVENTOR
ROBERT C. KALEY
BY Bradley Cohn
ATTORNEY

United States Patent Office 2,926,709
Patented Mar. 1, 1960

2,926,709

GUARD FOR ROTARY POWER CUTTER

Robert C. Kaley, Landisville, Pa., assignor, by mesne assignments, to American Machine & Foundry Company, a corporation of New Jersey Application March 11, 1957, Serial No. 645,149

6 Claims. (Cl. 143—159)

This invention relates to cutting machines having power driven rotary saws or other cutters, and more particularly to a protective guard or shield mounted about the cutter for safety purposes. The conventional form of these machines consists of a circular or disc saw mounted on a rotating arbor. The saw generally is moved across the workpiece although the saw may be held stationary and the workpiece moved relative thereto. The term "saw disc" as used herein includes other forms of rotary cutters for special operations such as dadoing, shaping, molding and the like.

Machines of this type are generally provided with an arcuate guard enclosing the upper and mid-portion of the periphery of the cutter. It is an object of my invention to provide a means to cover the entire periphery of the saw when it is not engaged by the workpiece and that will permit engagement with the workpiece by exposing substantially only so much of the saw as is necessary to engage the workpiece to the end that the saw is still "covered" by the combination of the workpiece and my novel guard.

It is a further object of my invention to provide a guard which can be mounted on a tool of the type described to enclose the entire tool but will have a section that will yield or be guided over the workpiece.

It is a further object of this invention to provide a guard for the radial arm saw of the type described which will be partially operated by the guide fence and which will have a section operated by the guide fence to entirely enclose the saw. When the saw is behind the guide fence it may be lifted during the advance of the guide fence and into the workpiece.

It is a further object of the invention to provide a front section which could enclose a portion of the saw which is guided on the workpiece to expose substantially only that portion of the saw necessary for contacting the workpiece.

A further object of the invention provides a guard which may be fully operated by the workpiece for operations such as ripping for the purposes above described.

The novel features which I believe to be characteristic of my invention are set forth with particularity in the appended claims. My invention itself, however, both as to its organization and method of operation may be understood by reference to the apparatus embodying the invention and shown in the accompanying drawings in which:

Fig. 10 is a side elevation of a radial arm saw illustrated in conjunction with the improved safety guard;

Fig. 11 is a partial side elevation of a radial arm saw with the improved safety guard illustrating the position of the guard during the return movement of the saw after cutting operation;

Fig. 12 is a partial side elevation of a radial arm saw with the improved safety guard illustrating the same in an angular or bevel cutting position;

Fig. 13 is a front elevation of the radial arm saw with the improved safety guard during ripping operation;

Fig. 14 is a sectional end elevation of the safety guard, taken on line 14—14 of Fig. 1 illustrating the mounting means of the same, and Fig. 15 is a fragmentary exploded view of the guide and supporting plate of the safety guard.

Figure 1:
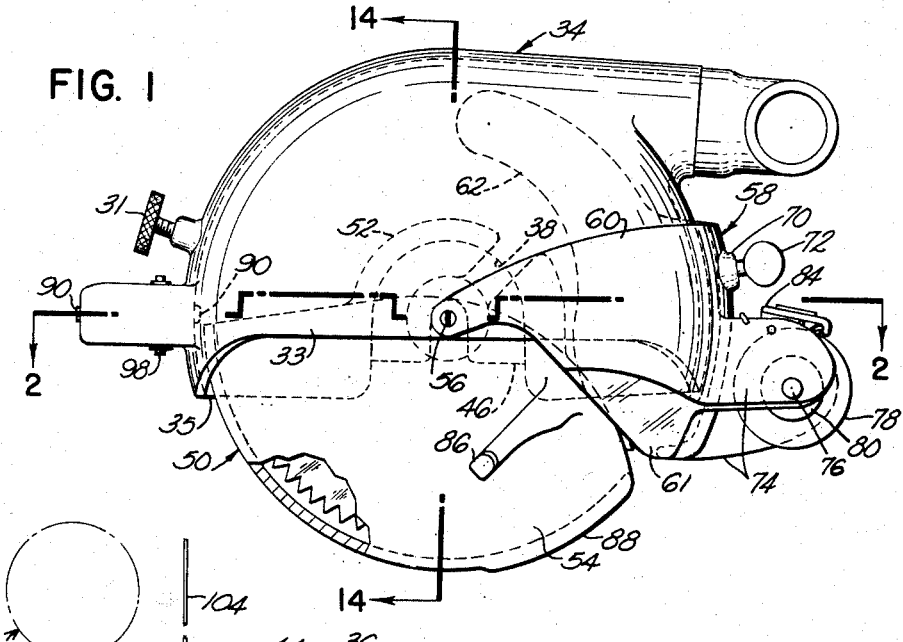
Fig. 1 is a front elevation of the safety guard for power tools.

Referring first to Fig. 10, the environment of the invention is illustrated by a radial arm sawing machine having a horizontal work table 20, a vertical standard 22 and a radial arm 24 on which is slidably mounted a carriage 26 pivotally supporting a motor and a motor housing 28 (Fig. 14) to the arbor shaft 30 of which is attached a cutting tool 32. The general construction of this type of saw is shown in the patent to Knapp 2,185,304, dated January 2, 1940. It will, of course, be obvious that my safety device may also be used in saws of the type shown in Schutz 2,353,088, dated July 4, 1944, or any other power tools of the same general descriptive characteristics.

Since the structure of the saw itself does not constitute an essential part of this invention, further description thereof is deemed unnecessary except to note that the saw may be moved across the workpiece W to the dotted line position shown in Fig. 10 for the purpose of operating on the workpiece; or may be tilted to what is called a "bevel" position as in Fig. 12; or rotated to a "rip" position as in Fig. 13.

Referring now to Figs. 1, 2, 3, 14 and 15, my novel safety guard has a stationary guard segment 34 covering substantially the upper half of the cutting tool. For facility of description, stationary top guard segment 34 has an outward wall 33 and an inward wall 35. Outer guard segment 34 is secured to the motor housing 28 by engaging annular groove 36 with the cut-out 38 of the inward wall 35 and by means of thumb screw 40 securing lug 42 of wall 35 to motor housing 28. Inward wall 35 additionally has secured to it a U-shaped spacer 44 to which is secured a guiding and supporting plate 46 which carries a bearing plate 48. Bearing plate 48 serves as the pivotal bearing for the inward wall 52 of the movable trailing guard sector 50 whose outward wall 54 is pivotally secured on the pivot 56 to the outward wall 33 of the stationary sector 34.

Figure 9:
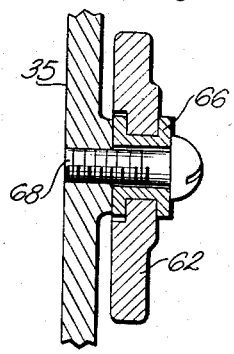
Fig. 9 is a fragmentary sectional end elevation of the safety guard assembly, taken on line 9—9 of Fig. 3.

A leading movable guard sector 58 is also pivoted to the stationary guard member 34 by having its outer wall 60 pivotally mounted on pivot 56 of outward wall 33. The inward wall 62 has an arcuate slot 64 (Figs. 2, 3 and 9) which is engaged by annular groove collars 66 supported by studs 68 secured to the inward wall 35 of stationary top guard. Because the axial center of the arc of slot 64 passes through pivot 56, it is apparent that the leading movable guard sector is freely pivotable about the cutting tool 32 up to the degree permitted by slot 64 and collars 66.

The leading guard sector 58 receives through a boss 70 a threaded thumb screw 72 which when tightened to contact the outer edge of stationary guard member 34 will support the leading movable guard member 58 against movement. The outward wall 60 of the leading sector 58 has an inwardly inclined portion 61 having a cam edge 51 which will contact the outward wall 54 of the trailing sector 58 to prevent telescoping between the movable sectors 50 and 58. The inwardly inclined surface 61 and cam edge 51 has another function hereinafter described.

Figure 7:
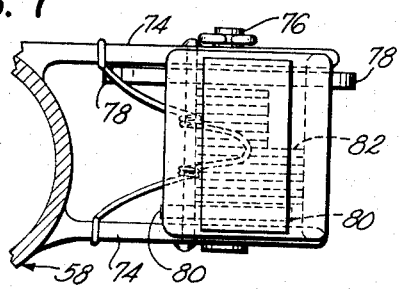
Fig. 7 is a plan view of the same taken on line 7—7 of Fig. 6.
Figure 6:
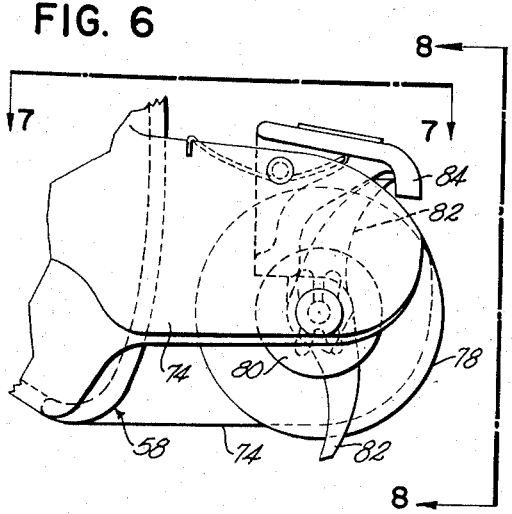
Fig. 6 is a fragmentary front elevation of the guard illustrating the anti-kickback finger assembly.
Figure 8:
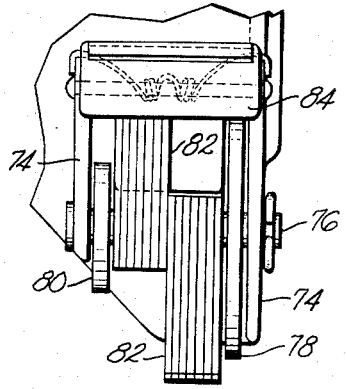
Fig. 8 is an end elevation of the anti-kickback finger assembly, taken on line 8—8 of Fig. 6.

Leading guard sector 58 has a pair of integral lugs 74 which support a shaft 76. Rotatably mounted on shaft 76 is an inward roller 78 and an outward roller 80. Inward roller 78 is preferably of slightly larger diameter than outward roller 80. Between the rollers 78 and 80, shaft 76 also carries anti-kickback fingers 82 (Figures 6 to 8) which can be held upwardly in inoperative position by a spring-loaded movable clamp 84.

The trailing guard sector 50 carries a handle 86 spaced outwardly from the outer wall 54 so that as shown in Fig. 13 it passes to the outside of the outer wall 33 when sector 50 is pivotally telescoped into stationary guard sector 34. The purpose of the handle 86 is merely for convenience in manually moving the movable sector 50. The stationary sector 34 also carries a boss threadedly receiving a knurled screw 31 which when tightened will contact the edge of the trailing movable sector 50 to support it in any adjusted position relative to stationary sector 34.

Figure 2:
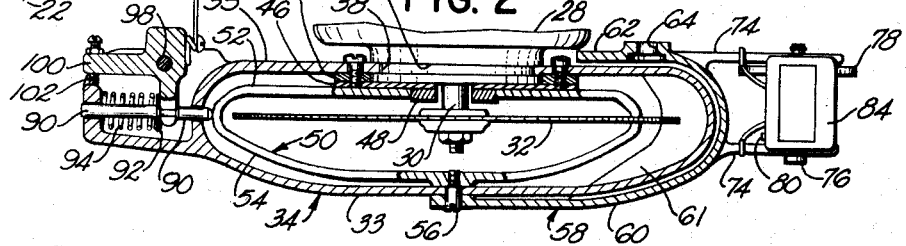
Fig. 2 is a sectional plan view of the same, taken on line 2—2 of Fig. 1.
Figure 3:
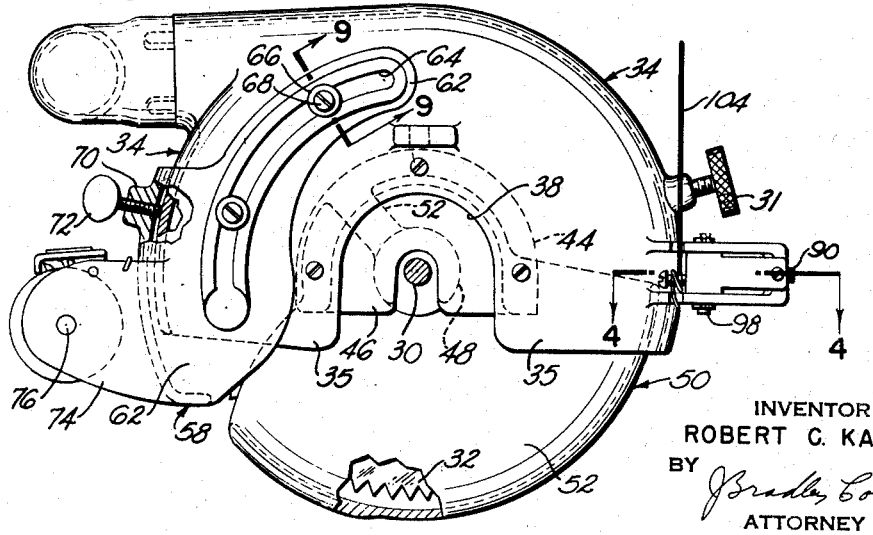
Fig. 3 is a rear view of the safety guard.

A cam surface 88 is formed or located on the outer periphery of sector 50 and near its leading edge (Figs. 1, 2 and 10). When sector 50 is swung to a backward or open position, cam 88 can engage a spring-loaded pin 90 which will retain sector 50 in this raised position against the action of gravity or against a spring-load if necessary or desirable.

Figure 4:
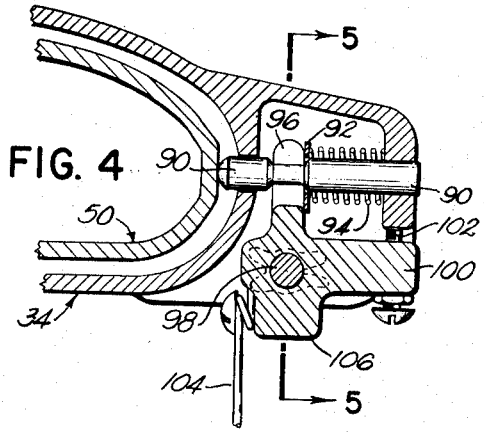
Fig. 4 is a partial sectional plan view of the safety guard illustrating an automatic friction locking and release mechanism.
Figure 5:
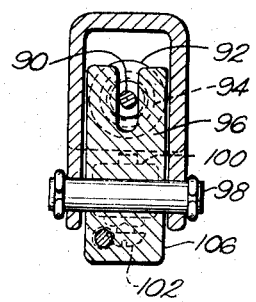
Fig. 5 is a sectional end elevation of the same, taken on line 5—5 of Fig. 4.

The pin 90 carries a spring retainer washer 92 against which the spring 94 bears to move the pin into contact with cam 88. A forked lever 96 pivoted on a shaft 98 engages the retainer collar 92 to move the pin 90 against the action of spring 94 and out of contact with cam surface 88. The forked lever 96 has a side arm 100 carrying an adjusting screw 102 which, as will be clearly seen by reference to Fig. 4, can adjust the extent of movement of the pin 90 under the bias of spring 94. The purpose of adjusting screw 102 is to adjust the pin 90 so that it will not contact any portion of trailing member 50 other than the raised cam portion 88. A pivoted wire trip arm 104 is pivotally secured to an arm 106 of the forked lever 96. If trip arm 104 is contacted from the right, as shown in Fig. 4, the pin 90 will be moved against the urging of spring 94 and out of contact with cam surface 88.

Referring now to Figs. 2 and 12, it will be seen that when the carriage 26 is moved toward the column 22 the lever 104 will contact the column 22 and, by the mechanism just described, release the pin 90 from the trailing sector 50 which will trip into the position shown in Figs. 1 and 10 by the action of gravity or it may be spring-loaded. The pivoted wire lever 104 can be swung upwardly into inoperative position for ripping operations as will hereinafter be more fully explained.

*Operation*

The operation of the device will be more fully understood when explained in connection with the three most common actions of a cutting tool of this type, namely cross-cutting, rip cutting and bevel cross cut.

*Cross cutting*

In a cross cutting action with a saw blade or similar tool reference should be made to Fig. 10 wherein the workpiece W is placed on the table 20 against the fence 21, the cutting tool being in the full line position is moved through the workpiece to the dotted line position to operate on the workpiece. Referring to the full line position it will be seen that the lever 104 having contacted the column 102, trailing sector 50 has dropped into the position shown while the leading sector 50 has been cammed upwardly by its cam edge 51 contacting the fence 21. As the saw carriage is moved forward in the direction of the dotted arrow of Fig. 10 the leading sector 58 drops downwardly toward the workpiece W until the larger roller 78 contacts the workpiece and the guard 50 thereby encloses the otherwise exposed leading edge of the cutting tool 32, the balance of which is in workpiece W.

Simultaneously, the fence 21 (or the workpiece W if it be higher than the fence) swings the trailing guard sector 58 backwardly and upwardly to the position shown in dotted lines so that the trailing edge of the cutting tool 32 above workpiece W is substantially entirely covered or guarded. As the trailing sector 50 swings upwardly its cam surface 88 contacts the pin 90 and supports it in this raised position so that on return of the saw carriage 26 to the solid line position the guard sector 58 will clear the fence 21 (or the workpiece W if it be higher). When, however, the carriage is fully returned to the rearward position, the trip lever 104 will contact the column 22 to release the pin 90 to permit the trailing sector 50 to return to its position as shown in full lines in Fig. 10.

*Ripping operation*

Referring now to Fig. 13, the ripping operation is performed by rotating the pivotal carriage 26 ninety degrees and locking it in a stationary position so that the cutting tool 32 rotates in a plane parallel to the fence 21. The workpiece W' is then moved past the cutting tool 32 in the direction of the straight arrow as shown in Fig. 13. For this operation the lever 104 is swung upwardly into an inoperative position. The trailing guard sector 50 is manually raised by the handle 86 to a position as illustrated in Fig. 13 to clear by a small amount the top of the workpiece W'. The knurled screw 31 is then tightened to retain the guard sector in this position.

The leading sector 58 (which in this operation is in fact a trailing sector) is dropped down to the height of the workpiece so that the roller or feeler 78 will contact the top of the workpiece and the anti-kickback fingers 82 are released from a spring clip 84 so that they fall downwardly into contact with the workpiece. As the workpiece W' is fed in the direction of the arrow the anti-kickback fingers perform no function but permit the workpiece to move. If, however, kickback tendency should occur, the kickback fingers 82 will bite into the work in a known manner as more fully explained in patent to Schutz No. 2,562,396, dated July 21, 1951. However, in this regard it should be noted that with my novel construction the proper angulation at which the kickback fingers 82 contact the workpiece is established by the large roller 78 which contacts the workpiece and accordingly a proper setting is obtainable merely by dropping the roller 78 down on the work and then tightening thumb screws 72. Thus accuracy for the anti-kickback fingers may be built into the machine and not be left to the judgment of the operator.

*Bevel cutting*

It should be noted that the following remarks are applicable whether it is a straight bevel cut or a miter bevel cut, since in either case the guard operates the same. For a bevel cut in which the saw is placed in angular position, as illustrated in Fig. 12, the flat canted portion 61 of the leading guard sector 58 permits the roller 80 of smaller diameter to contact the workpiece and the portion 61 does not conflict with the workpiece. Furthermore, angulation of the portion 61 permits it to serve as the raising cam complementing cam edge 51 for contact with the fence 21 when the machine is moved to the rearward position near column 22. Accordingly, the shape and formation of the portion 61 permits the device to operate in the manner described for normal cross cuts.

I claim:

1. A safety guard securable to a rotary power cutting tool having a fixed path of movement relative to a workpiece and comprising a relatively stationary housing to shield substantially one half the arc of travel of the cutting edge of said tool, a pair of pivoted movable guard members constructed and arranged to move substantially about the axis of the circular path of travel of the cutting edge of said cutting tool and each arranged to shield a portion of the arc of travel of said cutting tool, the first of said movable members having a bottom portion suitable to contact a workpiece during the operation of said cutting tool therein and the second of said movable members having a leading edge to contact the said workpiece and to raise said second member over said workpiece as said cutting tool engages said workpiece, said last-named member having automatically releasable self-engaging means to support it in said raised position.

2. A device substantially as set forth in claim 1 further characterized in that said releasable self-engaging means comprise a contact instrumentality resiliently urged to engage a portion of said second movable member and a trip device operatively engageable in a selected position of said tool to automatically move said contact instrumentality out of engagement with said second movable member to release said movable member in said selected position of said tool.

3. A device substantially as set forth in claim 1 further characterized in that one of said movable guard members supports an anti-kickback assembly and said anti-kickback assembly and said movable guard member have a work contacting feeler to locate said assembly and said movable guard member in operative position relative to said workpiece.

4. A device substantially as set forth in claim 2 further characterized in that one of said movable guard members supports an anti-kickback assembly and said anti-kickback assembly and said movable guard member have a work contacting feeler to locate said assembly and said movable guard member in operative position relative to said workpiece.

5. A partial guard and anti-kickback device for a rotary cutting tool comprising a segmental housing pivotally mounted to envelop and move about a portion of the cutting surface of said rotary cutting tool, an anti-kickback assembly secured to said segmental housing, a work contacting surface on said housing located in a predetermined relation to said anti-kickback assembly to correctly locate said anti-kickback assembly and said segmental housing relative to a workpiece contacted by said work contacting surface, and means to secure said located housing against such pivotal movement whereby said assembly and said housing are operatively positioned both to guard said tool and to prevent kickback.

6. A safety device for substantially fully enclosing a rotary cutting tool comprising a stationary housing constructed and arranged to envelop a relatively large segmental portion of said cutting tool, said stationary housing having securing means for supporting it about said cutting tool, a segmental housing movably secured to said stationary housing for swinging motion about substantially the remaining portion of said cutting tool, said remaining portion including the work contacting portion of said tool, said movable housing having a portion operative to engage a structure through which said work cutting tool moves from a back position to move said movable housing about said tool to expose a portion of said cutting tool, a releasable securing means to maintain said movable housing in said position exposing said defined portion of said cutting tool, and a trip associated with said releasable securing means and operable when contacted to release said releasable securing means, and a member adapted to contact said trip after said cutting tool has moved backward through said structure whereby said cutting tool may be moved backward through said structure and said movable housing will clear said structure and said movable housing will then be released.

References Cited in the file of this patent

UNITED STATES PATENTS

| 247,558 | Groff | Sept. 27, 1881 |
| 1,481,569 | Tannewitz | Jan. 22, 1924 |
| 1,735,240 | Ennen | Nov. 12, 1929 |
| 1,813,231 | Crowe | July 7, 1931 |
| 1,830,151 | Wilderson | Nov. 3, 1931 |
| 1,888,679 | Knapp | Nov. 22, 1932 |
| 2,185,304 | Knapp | Jan. 2, 1940 |
| 2,257,459 | Gardner | Sept. 30, 1941 |
| 2,353,088 | Schutz | July 4, 1944 |
| 2,562,396 | Schutz | July 31, 1951 |

FOREIGN PATENTS

| 47,494 | Germany | June 18, 1889 |